US 6,529,236 B1

(12) United States Patent
Watanabe

(10) Patent No.: US 6,529,236 B1
(45) Date of Patent: Mar. 4, 2003

(54) DIGITAL CAMERA FOR OUTPUTTING DIGITAL IMAGE SIGNALS AND IMAGE REPRODUCING DEVICE CONNECTABLE THEREOF

(75) Inventor: Mikio Watanabe, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/928,220

(22) Filed: Sep. 12, 1997

(30) Foreign Application Priority Data

Sep. 20, 1996 (JP) .............................. 8-250187

(51) Int. Cl.[7] ......................... H04N 5/235; H04N 5/335
(52) U.S. Cl. ..................... 348/230.1; 348/317; 348/552
(58) Field of Search ................................ 348/222, 552,
348/510, 513, 514, 516, 518, 231, 207.99,
207.1, 207.2, 222.1, 229.1, 230.1, 231.99,
231.3, 231.6, 231.9, 316, 317

(56) References Cited

U.S. PATENT DOCUMENTS

| | | | | |
|---|---|---|---|---|
| 5,264,939 A | * | 11/1993 | Chang | 348/222 |
| 5,440,343 A | * | 8/1995 | Parulski et al. | 348/316 |
| 5,528,291 A | * | 6/1996 | Oda | 348/322 |
| 5,786,851 A | * | 7/1998 | Kondo et al. | 348/222 |
| 5,841,471 A | * | 11/1998 | Endsley et al. | 348/231 |
| 6,005,613 A | * | 12/1999 | Endsley et al. | 348/207 |

OTHER PUBLICATIONS

Bloks, The IEEE–1394 High Speed Serial Bus, Philips Journal of Research, vol. 50, No. 1/2, pp. 209–216, Jul. 1996.*
P1394 Standard for a High Performance Serial Bus, P134 Draft 8.0v2, Jul. 7, 1995, IEEE Standards Department Copyright and Permissions 445, Hoes Lane, P.O. Box 1331 Piscataway, NJ 08855–1331, USA.

* cited by examiner

Primary Examiner—Ngoc-Yen Vu
(74) Attorney, Agent, or Firm—Birch, Stewart, Kolasch & Birch, LLP

(57) ABSTRACT

In a digital camera, an image sensor or imaging device is driven in a partial pixel read mode during framing. The resulting image signal output from the image sensor is transformed to image data which can be displayed on, e.g., a display in real time. These image data are sent from the camera in an isochronous mode via a transmission interface and a cable connected to the interface. When a release command is input, the image sensor is driven in a full pixel read mode. Image data generated in this mode are written to a removable memory connected to a card interface or sent in an asynchronous mode via the transmission interface and cable. An image reproducing device is also capable of being connected to the camera by the cable.

11 Claims, 12 Drawing Sheets

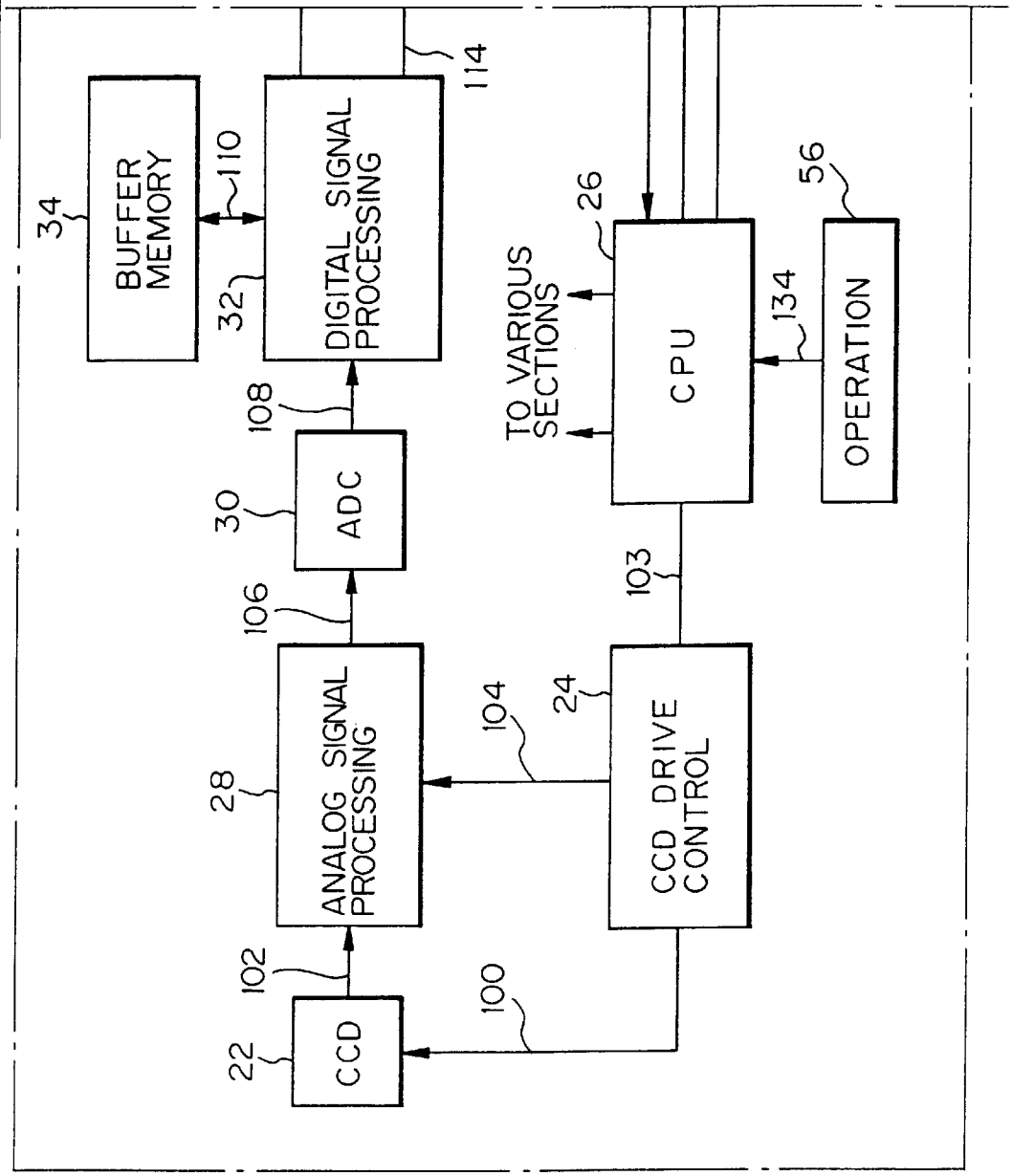

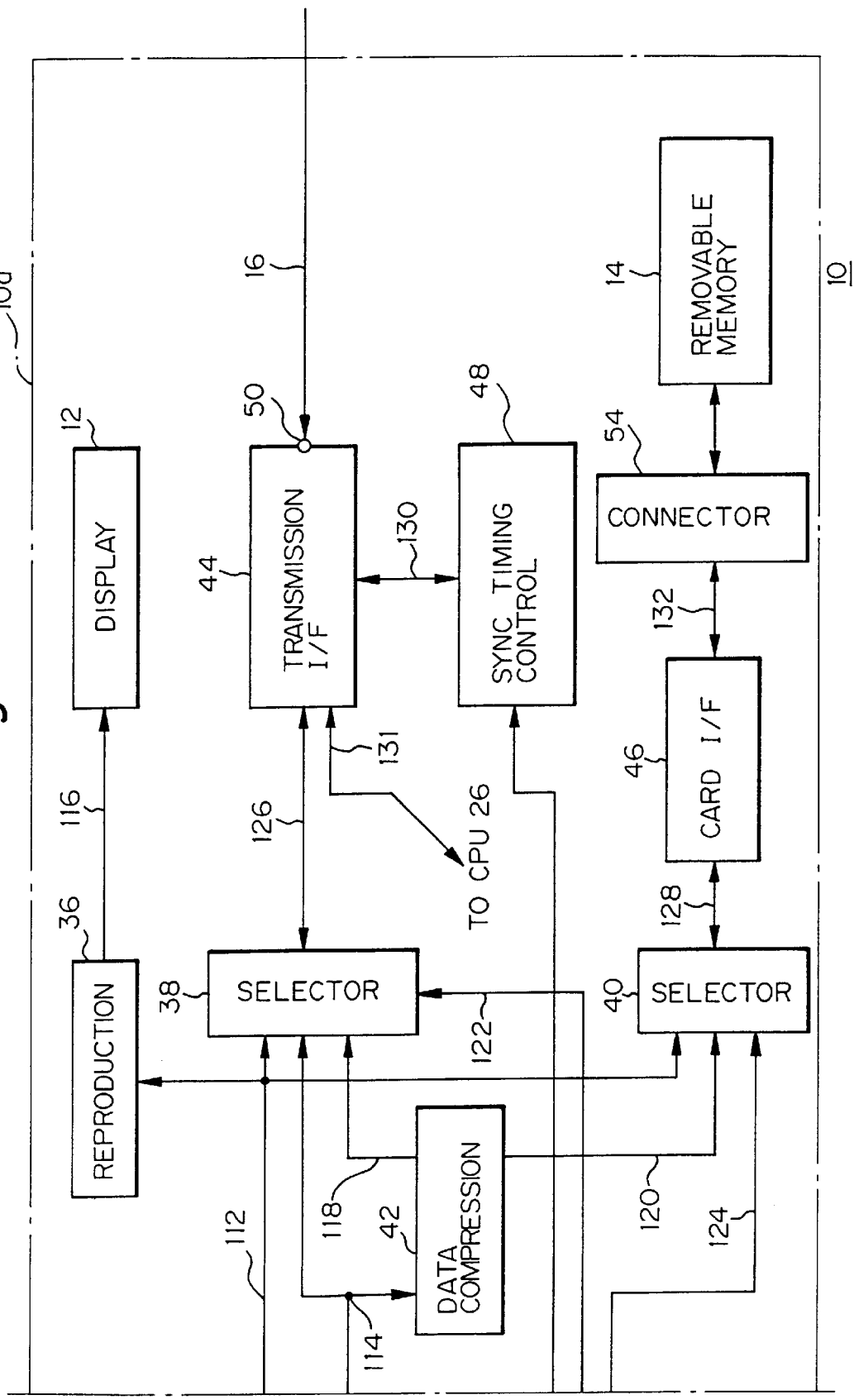

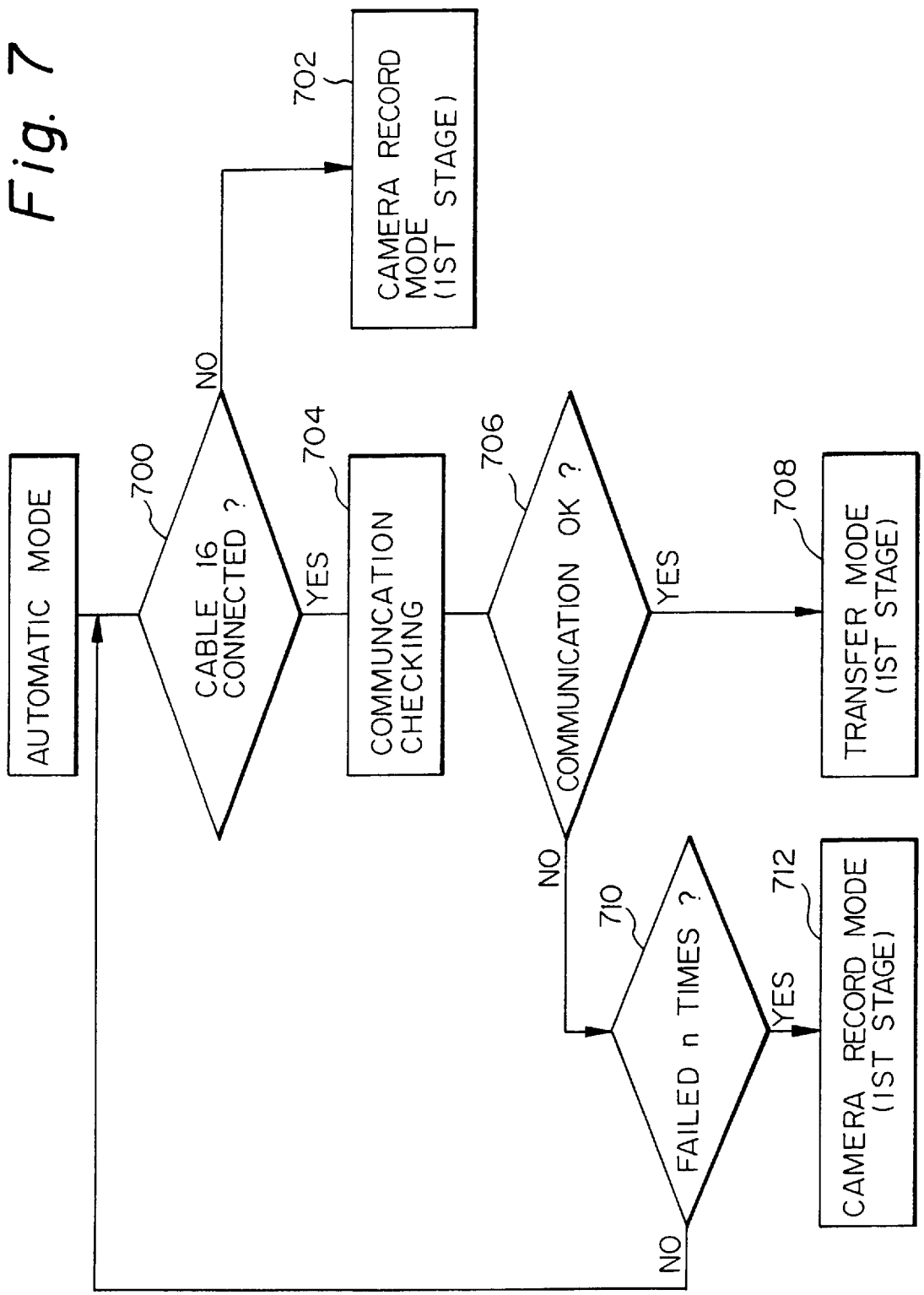

DIGITAL CAMERA FOR OUTPUTTING DIGITAL IMAGE SIGNALS AND IMAGE REPRODUCING DEVICE CONNECTABLE THEREOF

BACKGROUND OF THE INVENTION

1. Field of the Invention

The present invention relates to a digital camera for shooting a desired subject and outputting a digital image signal representative of the subject. More particularly, the present invention relates to a digital camera capable of sending an image signal for a framing purpose, and an image reproducing device connectable to the digital camera for outputting the image signal.

2. Description of the Background Art

A recent achievement in the imaging art is a digital camera capable transforming an image signal output from a CCD (Charge Coupled Device) image sensor or similar solid state imaging device to digital image data, and recording the digital image data in a memory card or similar recording medium, With an advanced type of digital camera, it is possible to read image data out of a recording medium and feed them to a television (TV) receiver, personal computer or similar output terminal so as to reproduce and display an image represented by the image data.

A digital camera including a CCD image sensor having, e.g., about 400,000 pixels is conventional. When image data output from this kind of digital camera are sent to the outside at a rate of about 14 MHz, i.e., a so-called TV rate, an image represented by the image data can be reproduced as a substantially real time image. However, when such an image is printed, a sufficiently high resolution is not achievable. In light of this, a CCD image sensor having about 1,300,000 pixels may be used in order to shoot a scene with a resolution high enough to be fit for, e.g., printing and send the resulting image data. This kind of scheme, however, prevents the image being shot from being sent in a real time fashion. As a result, even if the image data are displayed on a monitor of TV level, frames are partly lost, making it difficult for a person to perform framing while watching a real time image being shot.

SUMMARY OF THE INVENTION

It is therefore an object of the present invention to provide a digital camera capable of implementing real-time image transfer to the outside of the camera in order to allow a person to perform framing while monitoring an image, and to provide an image reproducing device connectable to the camera.

It is another object of the present invention to provide a digital camera capable of outputting image data having a high pixel density, and an image reproducing device connectable to the camera.

In accordance with the present invention, a digital camera for shooting a subject and outputting a digital image signal representative of the subject includes an imaging device selectively operable, in response to a drive signal, in a partial pixel read mode for outputting an image signal in which pixels constituting the image of the subject are reduced, or in a full pixel read mode for outputting an image signal having all of the pixels. A converting circuit converts each of the image signals selectively output from the imaging device to a digital image signal. A signal processing circuit processes the digital image signal. An outputting circuit outputs the image signals selectively output from the imaging device. A control circuit controls the operation of the digital camera. The control circuit selects either one of the partial pixel read mode and full pixel read mode and feeds a drive signal to the imaging device for causing it to operate in the mode selected. The outputting circuit includes a transmitting circuit for transmitting via a communication channel a first image signal output from the imaging device in the partial pixel read mode and then output from the signal processing circuit, while guaranteeing the data rate of the image signal, or transmitting via the communication channel a second image signal output from the imaging device in the full pixel read mode and then output from the signal processing circuit, and a recording circuit for recording the second image signal in a storage medium removably connected to a connector. The control circuit feeds the first image signal to the transmitting circuit to thereby sequentially transmit the first image signal via the communication channel. The control circuit sets up the full pixel read mode in response to a release command input by an operator to thereby feed the second image signal to either one of the first transmitting circuit and recording circuit.

Also, in accordance with the present invention, an image reproducing device is connectable to a digital camera via a communication channel. The digital camera includes an imaging device for shooting a subject and selectively operable, in response to a drive signal, in a partial pixel read mode for outputting an image signal in which pixels constituting the image of the subject are reduced, or in a full pixel read mode for outputting an image signal having all of the pixels. A converting circuit converts each of the image signals selectively output from the imaging device to a digital image signal. A signal processing circuit processes the digital image signal. A first transmitting circuit transmits via the communication channel a first image signal output from the imaging device in the partial pixel read mode and then output from the signal processing circuit, while guaranteeing the data rate of the first image signal, or transmits via the communication channel a second image signal output from the imaging device in the full pixel read mode and then output from the signal processing circuit. A control circuit controls the operation of the digital camera. The control circuit selects either one of the partial pixel read mode and full pixel read mode and feeds a drive signal to the imaging device for causing it to operate in the mode selected. The control circuit feeds the first image signal to the first transmitting circuit to thereby sequentially transmit the image signal via the communication channel. The control circuit sets up the full pixel read mode in response to a release command input by an operator to thereby feed the second image signal to either one of the first transmitting circuit and recording circuit. The image reproducing device includes a second transmitting circuit for receiving the first image signal via the communication channel, and transmitting an acknowledgement of receipt to the digital camera via the communication channel. An outputting circuit outputs the first and second image signals received by the second transmitting circuit.

BRIEF DESCRIPTION OF THE DRAWINGS

The objects and features of the present invention will become more apparent from the consideration of the following detailed description taken in conjunction with the accompanying drawings in which:

FIG. 1 shows how FIGS. 1A and 1B are combined;

FIGS. 1A and 1B are schematic block diagrams showing, when combined as shown in FIG. 1, a digital camera embodying the present invention and included in a digital camera system;

FIG. 7 is a flowchart representative of a routine to be executed by the entire system shown in FIGS. 1A, 1B and 2.

DESCRIPTION OF THE PREFERRED EMBODIMENT

Figure 2:
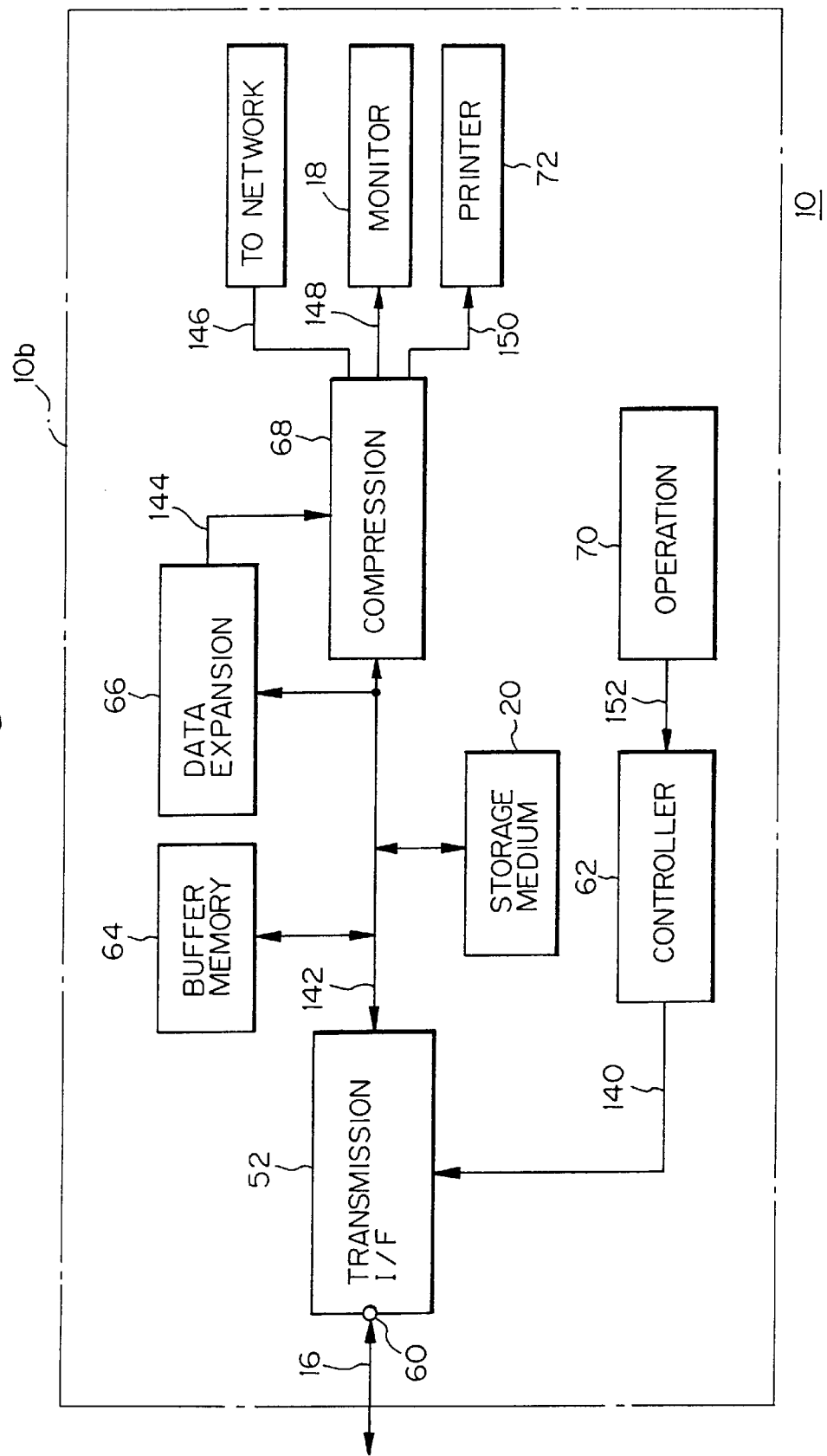
FIG. 2 is a block diagram schematically showing an image reproducing/filing device also included in the digital camera system.

Referring to FIGS. 1A, 1B and 2 of the drawings, a digital camera system including a digital camera embodying the present invention is shown and generally designated by the reference numeral 10. Briefly, the system 10 transforms image data being output from a CCD array or similar imaging device to a digital signal and sequentially displays images frame by frame. Further, in response to a release command, the system 10 records image data representative of an image shot in a recording medium.

The system 10 is made up of a digital camera 10a shown in FIGS. 1A and 1B and an image reproducing/filing device 10b shown in FIG. 2. The camera 10a shoots a desired subject and records the resulting image data therein or sends them to the outside of the camera. The image reproducing/filing device 10b stores the image data received from the camera 10a, displays an image represented by the received image data, and commands the camera 10a to perform a designated operation. The system 10 sequentially displays images being shot on a reproduction display 12 for a framing purpose (adjustment of the angle of view). Further, the system 10 compresses and codes image data representative of a subject shot at a timing corresponding to a release command, and records them in, e.g., a memory 14 removably connected to and received in the camera 10a. In addition, the system 10 sequentially sends the image data to the image reproducing/filing device 10b connected to the camera 10b by a cable 16. In this case, the system 10 sequentially displays images on a monitor 18 included in the device 10b for the framing purposes and compresses the image data representative of the image shot at the above timing. In addition, the system 10 compresses image data representative of a subject shot at a timing corresponding to a release command and sends the compressed image data to the device 10b; the device 10b writes the image data in a storage medium 20 thereof either optically or magnetically.

Particularly, in the illustrative embodiment, the camera 10a is capable of displaying a scene being picked up on itself or causing it to be displayed by the device 10b in a real time fashion for a framing purpose. Subsequently, in response to a release command input by the operator, the camera 10a shoots the scene with a high pixel density and records the resulting image data of high pixel density therein while sending them to the device 10b. It is to be noted that arrangements not relevant to the understanding of the present invention will not be shown or described, and that signals are designated by the same reference numerals as connection lines on which they appear.

As shown in FIGS. 1A and 1B, the digital camera 10a includes an imaging device implemented as a CCD image sensor 22 by way of example. The CCD image sensor, or bidimensional image sensor, 22 includes a light-sensitive surface to which an image representative of a subject is incident via a lens, not shown. The image sensor 22 transforms the incident image to a corresponding image signal. An RGB (red, green and blue) color filter, not shown, is positioned on the light-sensitive surface of the image sensor 22. The image sensor 22 receives a drive signal from a CCD drive control 24 via its input 100.

Figure 3:
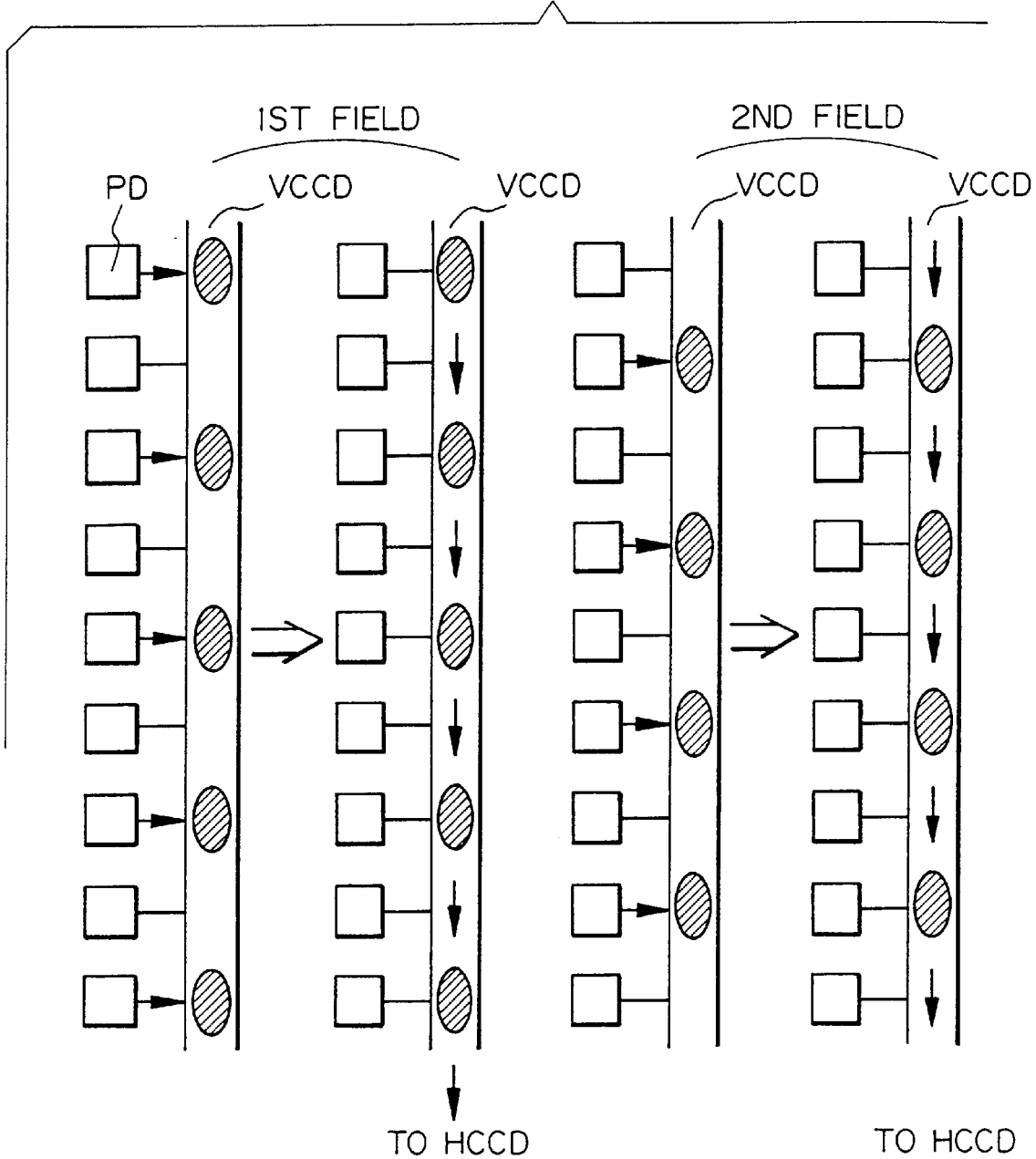
FIG. 3 demonstrates a full pixel read mode in which a CCD image sensor included in the embodiment is operable.

As shown in FIG. 3, in response to the drive signal received from the CCD drive control 24, the image sensor 22 transfers charges generated by a plurality of photodiodes or similar photoelectric transducers (PD) in accordance with the quantity of exposure to a vertical transfer path (VCCD) and a horizontal transfer path (HCCD), not shown. In the illustrative embodiment, an RGB color image signal has 1,280 pixels in the horizontal direction (H) and 1,024 pixels in the vertical direction (V), i.e., about 1,300,000 pixels in total. The image sensor 22 is operable in a full pixel read mode for producing such a color image signal on its output 102 field by field by use of an interlace scheme. Also, the image sensor 22 is operable, in accordance with. the drive signal 100, in a partial pixel read mode for decimating, or reducing, the pixels associated one-to-one with the PDs to one-half or one-fourth and reading one frame at a time. In the embodiment, the partial pixel read mode is set up when the image being picked up should be displayed in real time for framing.

As shown in FIG. 3, in the full pixel read mode, the PDs each constituting a particular pixel of the image sensor 22 generate charges for each of an odd (first) field and an even (second) field. These charges are transferred to the path VCCD and then transferred from the path VCCD to the path HCCD, not shown. The charges on the path HCCD are detected by a floating diffusion amplifier (FDA) or similar output circuit, not shown. As a result, an image signal derived from the charges appears on the output 102 of the image sensor 24.

Figure 4:
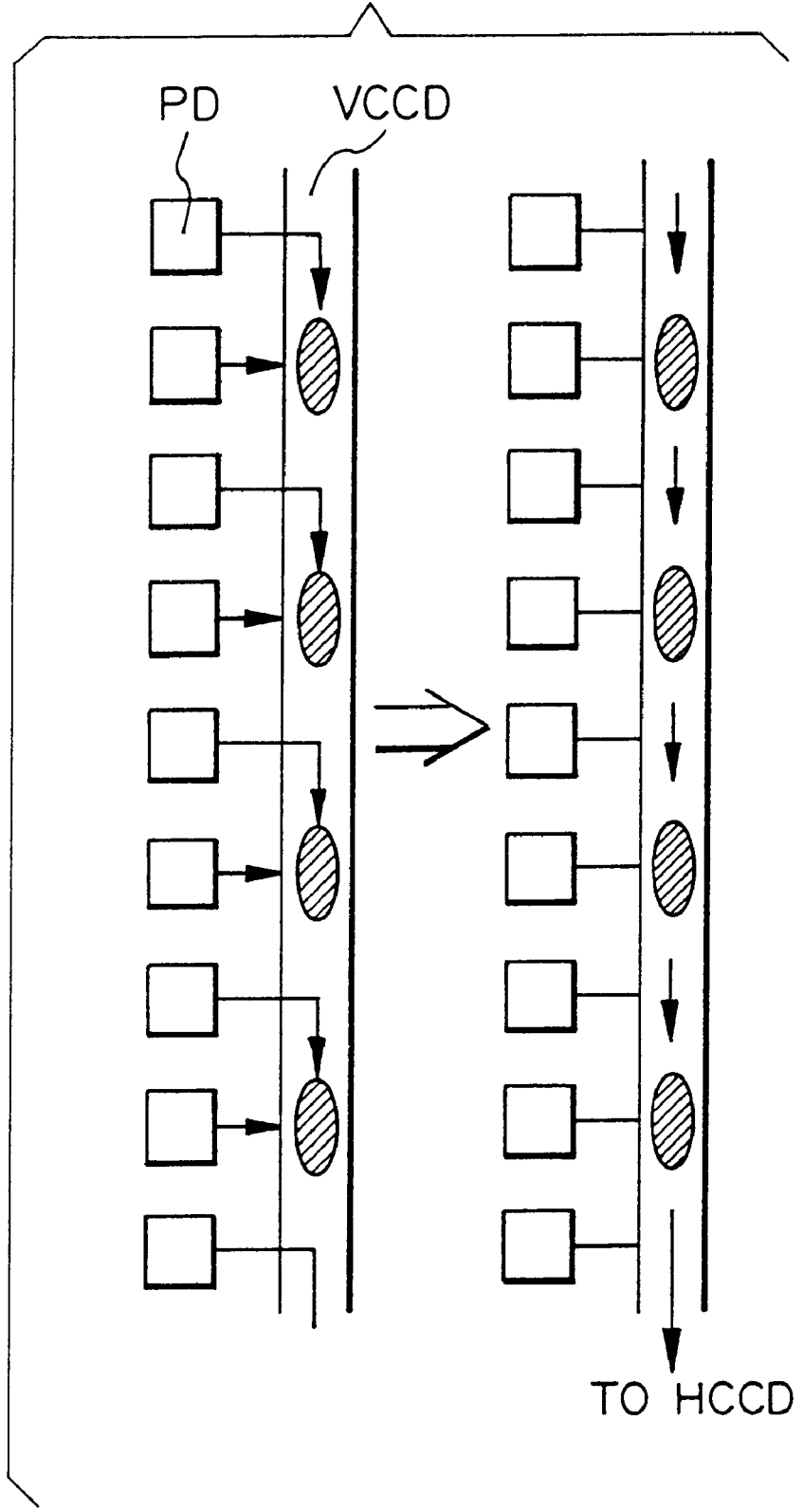
FIGS. 4 and 5 respectively demonstrates a ½ partial pixel read mode and a ¼ partial pixel read mode also available with the image sensor of the embodiment.

FIG. 4 demonstrates the partial pixel read mode operation of the image sensor 22 which halves the number of pixels. As shown, in response to the drive signal 100, the image sensor 22 adds each two nearby pixels in the vertical direction V on the path VCCD so as to form a single pixel. As a result, the number of pixels in the vertical direction V is halved. The image sensor 22 transfers the charges of the resulting composite pixels from the path VCCD to the path HCCD. Therefore, in this mode, the image signal has 1,280 (H)×512 (V) pixels.

Figure 5:
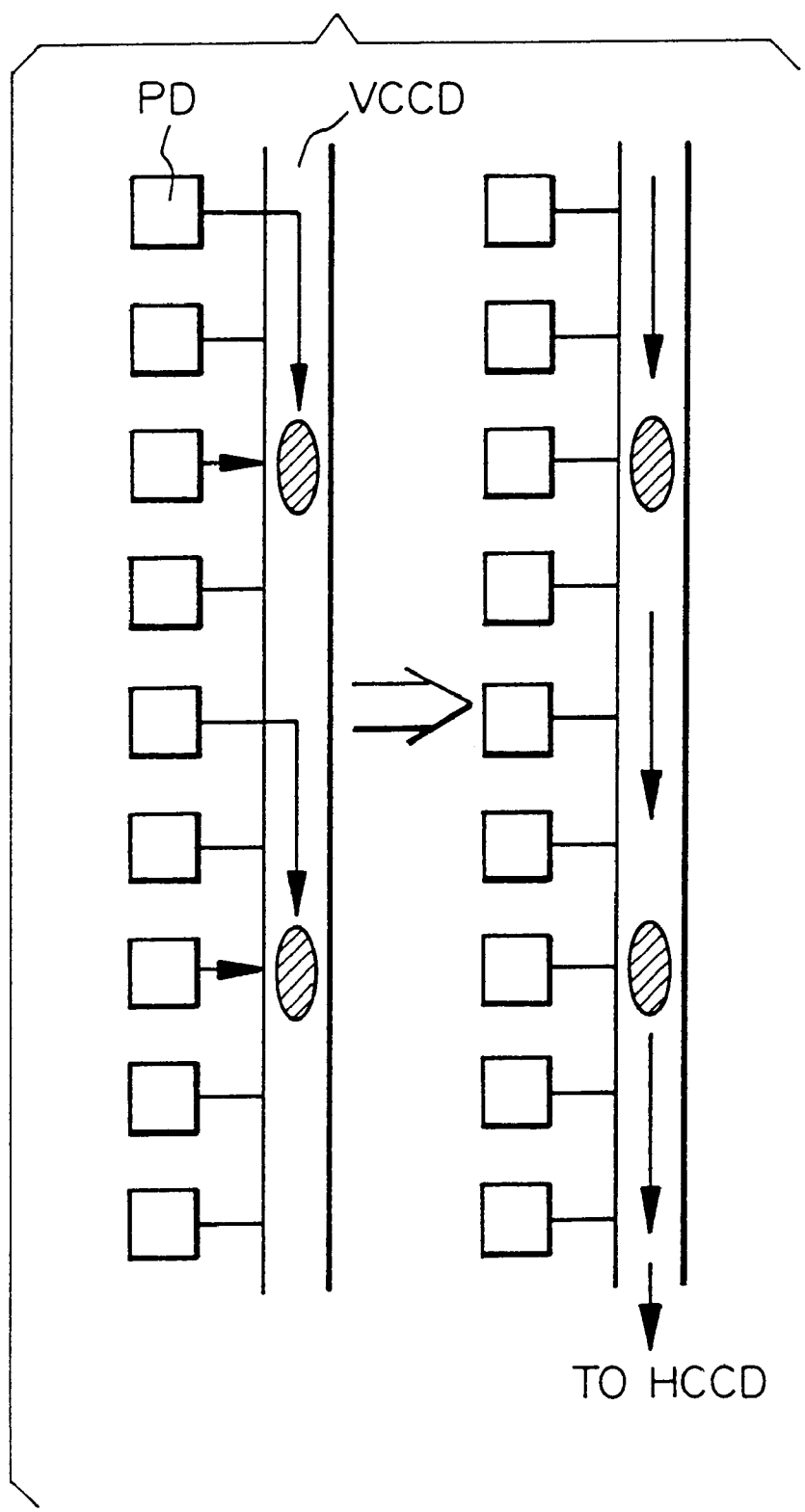

Further, FIG. 5 demonstrates the partial pixel read mode operation of the image sensor 22 which reduces the number of pixels to one-fourth. As shown, in response to the drive signal 100, the image sensor 22 adds two of each four pixels continuous in the vertical direction V on the path VCCD so as to constitute a single pixel, thereby reducing the number of pixels to one-fourth in the vertical direction V. The resulting composite pixels are transferred from the path VCCD to the path HCCD. In this case, the image signal has 1,280 (H)×256 (V) pixels. The image signal produced in such a ½ partial pixel read mode or a ¼ partial pixel read mode appears on the output 102 line-sequentially at a rate of thirty frames per second.

The CCD drive control 24 drives the image sensor 22 in accordance with a control signal 103 fed from a CPU (Central Processing Unit) 26. The control 24 generates a reference signal for the image shooting operation as well as vertical and horizontal transfer pulses, field shift pulses and other drive signals synchronous to the reference signal. The control 24 delivers the drive signals and a bias voltage for driving the image sensor 22 to the image sensor 22 via the connection line 100. In addition, the control 24 produces various kinds of timing pulses for an analog signal processing 28 from the reference signal and feeds them to the signal processing 28 via its output 104.

The analog signal processing 28 is a preprocessing circuit for providing the image signal output from the image sensor 22 with an adequate format. In the illustrative embodiment, the signal processing 28 amplifies the image signal received via its input 102 to a desired level and then removes needless signals by filtering, sampling and holding or similar technology, thereby producing only the desired image signal components. Further, the signal processing 28 clamps the image signal at a preselected level, and subjects the clamped image signal to white balance adjustment, color correction, tonality correction, and so forth. As a result, the image signal amplified to a level adequate for an analog-to-digital converter (ADC) 30 appears on the output 106 of the signal processing 28.

The ADC 30 sequentially digitizes the image signal coming in through its input 106. The ADC 30 converts the input image signal to, e.g., a ten-bit digital color image signal and produces the digital image signal on its output 108. The output 108 is connected to a digital signal processing 32. The digital signal processing 30 transforms the RGB image data coming in through its input 108 to a luminance signal Y and chrominance signals Cb and Cr. These signals Y, Cb and Cr are sequentially written to a buffer memory 34 connected to the digital signal processing 32 by a connection line 110. The buffer memory 34 has a capacity great enough to store the image data output from the image sensor 22 in the full pixel read mode and then transformed to the luminance signal and chrominance signals. The image data output from the image sensor 22 in either one of the previously stated read modes are written to the memory 34.

Further, the digital signal processing 32 thins, in both the horizontal and vertical directions, the pixels of the image data output from the image sensor 22 and then written to the buffer memory 34. In the illustrative embodiment, the digital signal processing 32 halves the image data output from the image sensor 22 in the ½ partial pixel read mode in the horizontal direction, and reduces them in the vertical direction by omitting the upper and lower lines of the image. The resulting image data have 640 pixels in the horizontal direction and 480 lines in the vertical direction. Likewise, the digital signal processing 32 reduces the image data output from the image sensor 22 in the ¼ partial pixel read mode to one-fourth in the horizontal direction, and cuts them off in the vertical direction by omitting the upper and lower lines of the image. As a result, image data constituted by 320 pixels in the horizontal direction and 240 lines in the vertical direction are produced. The reduced image data are read out of the buffer memory 34 and fed out via the output 112 of the digital signal processing 32. In this manner, the digital signal processing 32 generates image data for causing an image for framing to appear on the camera 10a and image reproducing/filing device 10b. In addition, the signal processing 32 reads the image data stored in the buffer memory 34 in the full pixel read mode of the image sensor 22, and delivers them via its output 114.

As stated above, in the embodiment, the digital signal processing 32 thins the image data when the image data adapted for display are read out of the buffer memory 34. Alternatively, the signal digital processing 32 may thin the image data when writing them in the buffer memory 34.

The digital output 112 of the signal processing 32 on which the thinned image data appear is connected to a reproduction 36 and two selectors 38 and 40. The reproduction display 12 mentioned earlier is connected to the output 116 of the reproduction 36. The reproduction 36 transforms the image represented by the image data output from the image sensor 22 in the ¼ pixel read mode to a signal format adequate for sequential display on the display 12. Specifically, the reproduction 36 converts the image data in the form of the luminance signal Y and chrominance signals Cb and Cr to a data format matching with the display 12. In the embodiment, the display 12 may advantageously be implemented as a liquid crystal display (LCD) having pixels corresponding one-to-one to input image data. The reproduction 36 transforms the image data coming in through its input 112 to data having an RGB format. The resulting 320 pixels×240 pixels of image data are fed to the display 12 via the connection line 116.

The other output 114 of the signal processing 32 is connected to the selector 38 and a data compression 42. The digital data compression 42 compresses and codes the image data output from the image sensor 22 in the full pixel read mode In the illustrative embodiment, the data compression 42 executes DCT (Discrete Cosine Transform) with, e.g., every 8×8 block of image data appearing on its input 114 in order to produce a transform coefficient (DCT coefficient). The data compression 42 normalizes the resulting transform coefficients by using a preselected threshold (quantizing step), and then allocates a particular Huffman code to each of the normalized coefficients, thereby outputting coded data. The coded data are delivered to the selectors 38 and 40 connected to its outputs 118 and 120, respectively. For the compression of the image data, use may advantageously made of a JPEG (Joint Photographic Coding Experts Group) system which is a color still picture compression standardizing system.

The CPU 26 is capable of controlling the data compression 42 such that the data compression 42 simply transfers the input image data to the selector 40 via the output 120 without compressing them. In this case, the image data are written to the removable memory 14 via the selector 40. In the illustrative embodiment, the output of the digital signal processing 32 is also connected to the input 114 of the selector 38, so that the image data output from the digital signal processing 32, i.e, uncompressed image data are applied to the selector 38. Alternatively, an arrangement may be made such that when the data compression 42 simply transfers the image data input to its input 114 to its output 118 without compressing them, the input 118 of the selector 38 functions in place of the other input 114. The image data fed to the selector 38 via the input 114 or 118 are sent to the image reproducing/filing device 10b via a transmission interface (I/F) 44 and the previously mentioned cable 16 under the control of the CPU 26.

The selectors 38 and 40 each selects one of a plurality of inputs and produces the input selected on its output. In the illustrative embodiment, the selectors 38 and 40 each performs such an operation in response to a switching control signal fed to its control input 122 or 124 from the CPU 26.

Specifically, the image data output from the image sensor 22 in the ½ or ¼ partial pixel read mode and further thinned by the digital signal processing 32 are applied to the input 112 of the selector 38. The image data output from the image sensor 22 in the full pixel read mode are applied to the input 114 of the selector 38. Further, the image data output from the image sensor 22 in the full pixel read mode and then compressed by the compression 42 are applied to the input 118 of the selector 38. The selector 38 connects the input selected in accordance with the switching control signal 122 to its output 126. As a result, the above three different kinds of image data are selectively fed to the transmission I/F 44.

As for the selector 40, the image data output from the image sensor 22 in the ½ or ¼ partial pixel read mode and further reduced by the digital signal processing 32 are applied to the input 112. The image data output from the image sensor 22 in the full pixel read mode and compressed by the compression 42 are applied to the input 120 of the selector 40. The selector 40 connects the input selected in accordance with the switching control signal 124 to its output 128. Consequently, the two different kinds of image data are selectively fed to a card I/F 46.

Further, the selector 40 is capable of receiving the image data read out of the removable memory 14 via its input 128. Then, the selector 40 connects the input 128 to the output 112 in response to a control signal fed from the CPU 26 and thereby transfers the input image data to the digital signal processing 32. In this case, the signal processing 32 once writes the image data in the buffer memory 34. Subsequently, the signal processing 32 reads the image data out of the memory 34 and delivers them via its output 114. The CPU 26 controls the above sections such that the uncompressed data read out of the removable memory 14 are compressed and then sent to the image reproducing/filing device 10b via the transmission I/F 44 and cable 16. In addition, the CPU 26 is capable of causing the image data to be read out of the removable memory 14 and sent to the device 10b via the selector 38 and I/F 44.

The transmission I/F 44 plays the role of a transmission control circuit for packetizing the image data coming in through its input 126 in a format adequate for the cable 16 and the destination connected to the cable 16, or receiving packet information from the destination, as needed. In the illustrative embodiment, the I/F 44 may advantageously be implemented as a bidirectional serial Id capable of transferring image data and control information serially and bidirectionally. Specifically, a synchronizing (sync) timing control 48 feeds a timing control signal to a control input 130 included in the I/F 44. The cable 16 is removably connected to an input/output terminal 50 also included in the I/F 44 and has a communication line. The I/F 44 controls, in response to he timing control signal, the synchronous transfer and asynchronous transfer of the image data and control data between it and a transmission I/F 52 included in the image reproducing/filing device 10b. Transfer modes available with the illustrative embodiment include, e.g., an isochronous mode and an asynchronous mode which are prescribed by IEEE 1394. The I/F 44 sets up either one of such transfer modes in accordance with a control signal 131 fed from the CPU 26, and then interchanges with the I/F 52 data packets containing the image data and control information necessary for image pick-up and transmission bidirectionally.

Particularly, when the image data output from the image sensor 22 in the partial pixel read mode should be displayed on the monitor 18 for the framing purpose, the CPU 26 causes the I/F 44 to set up the above isochronous mode in order to guarantee the amount of data to be transferred for a unit period of time, i.e., data rate. On the other hand, when the image data output from the image sensor 22 in the full pixel read mode should be transferred to the device 10b, the CPU 26 causes the I/F 44 to select the asynchronous mode for sending the data at a data rate matching with the ability of the device 10b. Further, to interchange control information and operation information representative of the operator's operation, the CPU 26 causes the I/F 44 to select the isochronous mode. The data rate assigned to the image data output in the partial pixel read mode may be thirty frames per second by way of example.

The I/F 44 is capable of detecting the cable 16 removably connected to its input/output terminal 50, and determining whether or not it can interchange data with another device, e.g., the device 10b via the cable 16. In the embodiment, the I/F 44 can determine data rates in the isochronous mode and asynchronous mode at the time of such communication checking. Further, the I/F 44 is capable of identifying a signal received from another device connected to the cable 16 by monitoring the communication line of the cable 16, and determining whether or not the I/F 44 can send data on the basis of the result of the identification (arbitration). The I/F 44 controls the transmission of the image data and control information on the basis of the result of the arbitration. Moreover, the I/F 44 is capable of identifying a data packet meant for the camera 10a, receiving such a packet, and reporting, e.g., a command contained in the packet to the CPU 26.

The sync timing control 48 generates control codes necessary for data transfer in addition to the previously mentioned timing control signal for the transmission I/F 44. Specifically, the control 48 generates a clock and control code assigned to a transfer mode selected and feeds them to the input 130 of the I/F 44.

The card I/F 46 serves as a memory control circuit for controlling the writing and reading of the image data out of the memory 14 removably connected to a connector 54 which is connected to the I/F 46 by a connection line 132. In the illustrative embodiment, the I/F 46 detects the memory 14 connected to the connector 54, determines whether or not image data can be written to the memory 14, and reports the result of this decision to the CPU 26.

The memory 14 connected to the connector 54 is capable of rewritably storing the image data compressed by the data compression 42 and representative of a plurality of frames. The memory 14 may advantageously be implemented as a PC card, SSFDC (Solid State Floppy Disk Card) or similar small size, light weight card type medium which is, e.g., an SRAM (Static Random Access Memory) or a flash EEPROM (Electrically Erasable Programmable Read Only Memory).

The CPU 26 plays the role of a controller for controlling the entire camera 10a as to the display, storage and transmission of the image data. The CPU 26 selectively generates command information for causing the device 10b to display and store the image data, or control signals for controlling the various sections of the camera 10a in accordance with various kinds of command information received from the device 10b.

The CPU 26 included in the illustrative embodiment will be described in detail hereinafter. An operation 56 is connected to a command input 134 included in the CPU 26. The CPU 26 selects one of two different operation modes in response to operation information received from the operation 56 and the command information received via the cable 16. The two operation modes are a camera record mode for recording the image data representative of a shot in the camera 10a, and a transfer mode for transmitting them to the device 10b. If the CPU 26 recognizes the connection of the camera 10a and device 10b via the cable 16, and if it determines that the camera 10a and device 10b are ready to communicate with each other, it sets up the transfer mode. If the camera 10a and device 10b are not ready to communicate, the CPU 26 sets up the camera record mode. These modes are selectively set up on the basis of operation data 134 output from the operation 56 or the command information received from the device 10b.

At the time of framing preceding an actual shot, the CPU 26 so controls the various sections of the camera 10a as to display a framing image on the display 12 of the camera 10a or the monitor 18 of the device 10b. This selection can be done based on the operation information 134, as desired. Assume that no significant operation information are present, or that operation information commanding an automatic mode is present. Then, in the illustrative embodiment, the CPU 26 causes the framing image to appear on the display 12 when the camera record mode is set, or causes them to appear on the monitor 18 when the transfer mode is set. Let this framing stage based on an image being picked up be referred to as a first stage.

If the camera record mode is selected in the above first stage, the CPU 26 generates a control signal for causing the CCD drive control 24 to drive the image sensor 22 in the ¼ partial pixel read mode. If the transfer mode is selected, the CPU 26 generates another control signal for causing the CCD drive control 24 to drive the image sensor 22 in the ½ partial pixel read mode, and at the same time feeds a control signal for setting up the isochronous mode to the transmission I/F 44.

The CPU 26 executes a second stage in response to a release command output from the operation 56 or in response to command information received from the device 10b. In the second stage, the CPU 26 delivers a control signal for causing the image sensor 22 to operate in the full pixel read mode to the CCD drive control 24. If the camera record mode is selected in the second stage, the CPU 26 delivers control signals to the various sections of the camera 10a such that the image data are compressed and then written to the removable memory 14. If the transfer mode is selected, the CPU 26 delivers control signals to the above sections such that the compressed image data are sent to the device 10b via the cable 16. At this instant, the CPU 26 feeds a control signal for setting up the asynchronous mode to the transmission I/F 44.

The CPU 26 is capable of invalidating the compressing function of the compression 42 so as to cause the image data arrived at the input 114 of the compression 42 to appear on the output 120 without being compressed, as stated earlier. This allows the uncompressed image data to be written to the removable memory 14.

As stated above, the CPU 26 has a function of controlling the operation mode (camera record mode or transfer mode) and the read mode of the image sensor 22, and a function of setting the transfer mode of the transmission IF 44. In addition, the CPU 26 has a function of controlling the various sections of the camera 10a in the consecutive stages of operation. In the embodiment, the CPU 26 selects the camera record mode or the transfer mode as directly instructed by the operation 56 and or the device 10b, or selects it automatically on the basis of the environment or state of the system 10. Specifically, for the automatic setting, the CPU 26 causes the I/F 44 to perform communication checking with the device 10b and then selects one of the two operation modes suitable for the result of the checking.

Further, in the first and second stages of operation, the CPU 26 selects one of the two operation modes on the basis of a release command output from the operation 56 or command information received from the device 10b via the I/F 44 and indicative of a release command.

The image reproducing/filing device 10b is applicable to, e.g., a personal computer system, set top box, handy data terminal or similar data terminal. Specifically, as shown in FIG. 2, the device 10b includes the transmission I/F 52 having an input/output terminal 60 removably connected to the cable 16. The I/F 52 may be identical in configuration with the I/F 44 shown in FIG. 1B. Particularly, in the embodiment, the I/F 52 performs the following operation under the control of a controller 62. The I/F 52 receives the image data and control information from the camera 10a via its input/output terminal 60, and produces the image data on its output 142 while producing the control data on its output 140. Also, on receiving control information on its control input 140, the I/F 52 sends them to the camera 10a via its input/output terminal 60. The output of the I/F 52 is connected to a bus 142. Also connected to the bus 142 are a buffer memory 64, a storage medium 20, a data expansion 66, and a reproduction 68.

Figure 6A:
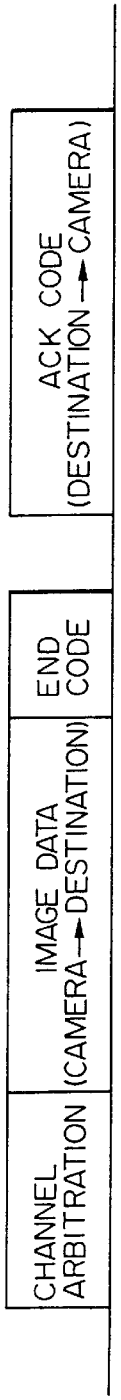
FIGS. 6A and 6B respectively show data transfer in an asynchronous mode and a synchronous mode available with each of transmission interfaces shown in FIGS. 1B and 2.
Figure 6B:
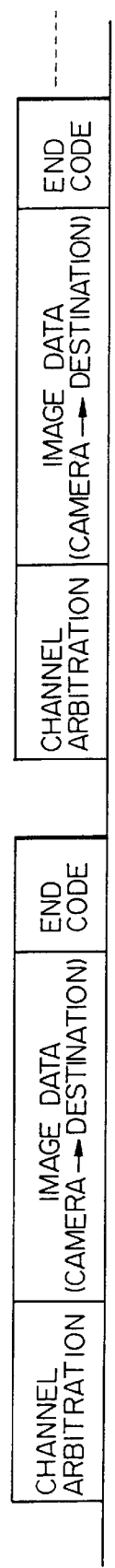

As shown in FIGS. 6A and 6B, the I/Fs 44 and 52 of the illustrative embodiment each has an asynchronous mode (FIG. 6A) and an isocbronous mode (FIG. 6B). The I/Fs 44 and 52 each generates an arbitration signal and delivers it to the cable 16. The arbitration signal protects signals output from the camera 10a and device 10b from conflict. The I/Fs 44 and 52 each divide the image data into a plurality of units, i.e., data packets and sends the data packets after the respective arbitration signal. In addition, the I/Fs 44 and 52 each send an end signal indicative of the end of the data packets via the cable 16. Particularly, in the asynchronous mode (FIG. 6A), the I/Fs 44 and 52 are each capable of receiving an acknowledgement code or similar answer signal from the destination after the transmission of each packet.

In the illustrative embodiment, by sending a plurality of data packets to the I/F 52 via the cable 16, the I/F 44 transfers image data representative of a single frame or picture in a cycle prescribed by transmission control. When the I/F 52 receives command information corresponding to operation information from an operation 70, the I/F 52 constructs data packets including the command information and sends them to the I/F 44.

The buffer memory 64 and storage medium 20 each is used to store the image data coming in through the input 142. In the illustrative embodiment, the buffer memory 64 temporarily stores the image data received from the camera 10a in the asynchronous mode, i.e., the image data output from the image sensor 22 in the full pixel read mode at the second stage, which begins in response to the release command, and then compressed by the compression 42. The storage medium 20 sequentially stores the image data written to the buffer memory 64 or causes the buffer memory 64 to store the image data of the medium 20 when they should be sent from the device 10b, as needed. The storage medium 20 may advantageously be implemented by a magnetic and/or optical storage medium or a semiconductor memory having a great capacity. The image data written to the buffer memory 64 are delivered to the data expansion 66 via the bus 142. The buffer memory 64 is capable of temporarily storing the image data output from the image sensor 22 in the partial pixel read mode and received from the camera 10a. This kind of data are stored in the buffer memory 64 for a moment and then input to the reproduction 68 via the bus 142.

The data expansion 66 expands and decodes the compressed image data applied to its input 142. In the embodiment, the data expansion 66 expands and decodes the image data read out of the storage medium 20. The decoded image data are fed from the output 144 of the expansion 55 to the reproduction 68.

The reproduction 68 transforms the image data to a format matching with the destination. In the illustrative embodiment, the reproduction 68 is connected to a telephone network or similar public communication network via a modem (modulator/demodulator), digital channel connector and so forth, although not shown specifically. The monitor 18 is connected to the output 148 of the reproduction 68 and implemented as, e.g., an RGB input monitor display. Further, a printer 72 is connected to the output 150 of the reproduction 68. Assume that the image data input to the I/F 52 in the isochronous mode are representative of a framing image and should be output to the monitor 18. Then, the reproduction 68 generates image data in, e.g., an RGB format, transforms them to an analog signal while adding synchronizing signals and other signals thereto, and feeds the analog signal to the monitor 18. When the image data applied to the input 144 of the reproduction 68 should be output to the printer 72, the reproduction 68 transforms the image data to a YMCK (yellow, magenta, cyan and black) format and then delivers them to the printer 72.

The controller 62 controls the various sections of the device 10b. Particularly, in the illustrative embodiment, the controller 62 generates various kinds of command information for controlling the camera 10a and feeds them to the I/F 52. For example, when the operation 72 outputs information corresponding to the operator's operation on its output 152, the controller 62 generates command information representative of a release command, sets the asynchronous mode in the I/F 52, and then causes the I/F 52 to send the command information via the input/output terminal 60 in the asynchronous mode. In addition, the controller 62, like the CPU 26, is capable of generating command information for setting a desired operation mode in the camera 10a in response to the operation information 152 output from the operation 70.

Reference will be made to FIGS. 7–11 for describing the operation of the digital camera system 10. In the operative condition of the system 10, an automatic mode is set in both the camera 10 and device 10b under the control of the CPU 26 corresponding to the operator's operation or the initial setting. In the automatic mode, the CPU 26 determines via the transmission I/F 44 whether or not the cable 16 is connected to the camera 10a (step 700, FIG. 7). If the answer of the step 700 is negative (NO), the CPU 26 sets up the camera record mode (first stage) (step 702). If the answer of the step 700 is positive (YES), the CPU 26 determines whether or not communication can be held (communication checking) (step 704).

In the step 704, the illustrative embodiment causes the camera 10a and device 10b to actually hold communication in order to determine whether or not preselected communication meant for the desired device can be accurately held via the cable 16. Specifically, the transmission I/F 44 produces a packet including a data rate, a transmission protocol format, and a check command for transmitting and confirming compression/uncompression, the format of image data, and so forth. The packet is sent in the asynchronous mode via the cable 16 connected to the input/output terminal 50. In response, the device 10b returns a packet including an answer to the above command to the I/F 44 in the asynchronous mode. When the I/F 44 receives the packet from the device 10b, the CPU 26 determines whether or not communication can be held on the basis of the received answer (step 706) If the answer of the step 706 is YES, the CPU 26 sets up the transfer mode (step 708) The answer received via the cable 16 in the asynchronous mode includes the data receiving ability of the device 10b, e.g., the specifications of the device 10b, so that subsequent information can be transferred in matching relation to the ability of the device 10b. Assume that the device 10b is in its preparatory state and rejects receipt, or that the answer from the device 10b is not received at all (NO, step 706). Then, the routine advances to a step 710, determining that the communication has failed.

In the step 710, the CPU 26 determines whether or not the communication has failed n (natural number) consecutive times. If the answer of the step 710 is NO, the routine returns to the step 700. If the answer of the step 710 is YES, meaning that the communication has failed n consecutive times, the CPU 26 sets up the camera record mode (first stage) (step 712). Specifically, the CPU 26 determines that the communication between the camera 10a and the device 10b has failed despite that the communication checking has been repeated a plurality of times.

As stated above, in the automatic mode, the illustrative embodiment gives priority to the transfer mode if communication can be held between the camera 10a and the desired destination via the cable 10. The camera record mode and transfer mode may each be set up in response to operation information output from the operation 59 of the camera 10a. Further, when the camera 10a receives information designating a particular operation mode from the device 10b via the cable 16 during communication checking, the CPU 26 sets up the designated operation mode.

Figure 8:
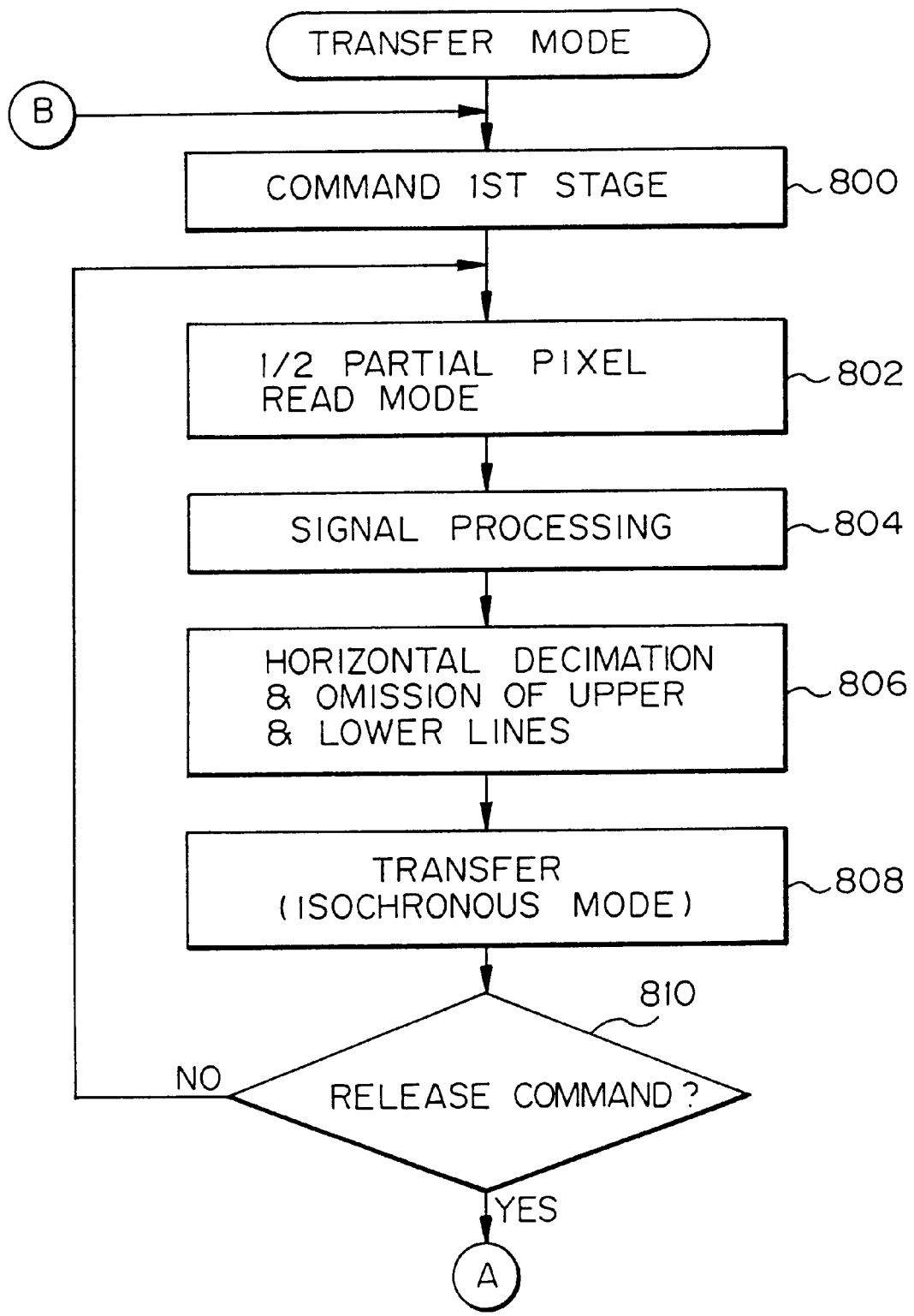
FIGS. 8–11 are flowcharts demonstrating specific operations of the system shown in FIGS. 1A, 1B and 2.
Figure 9:
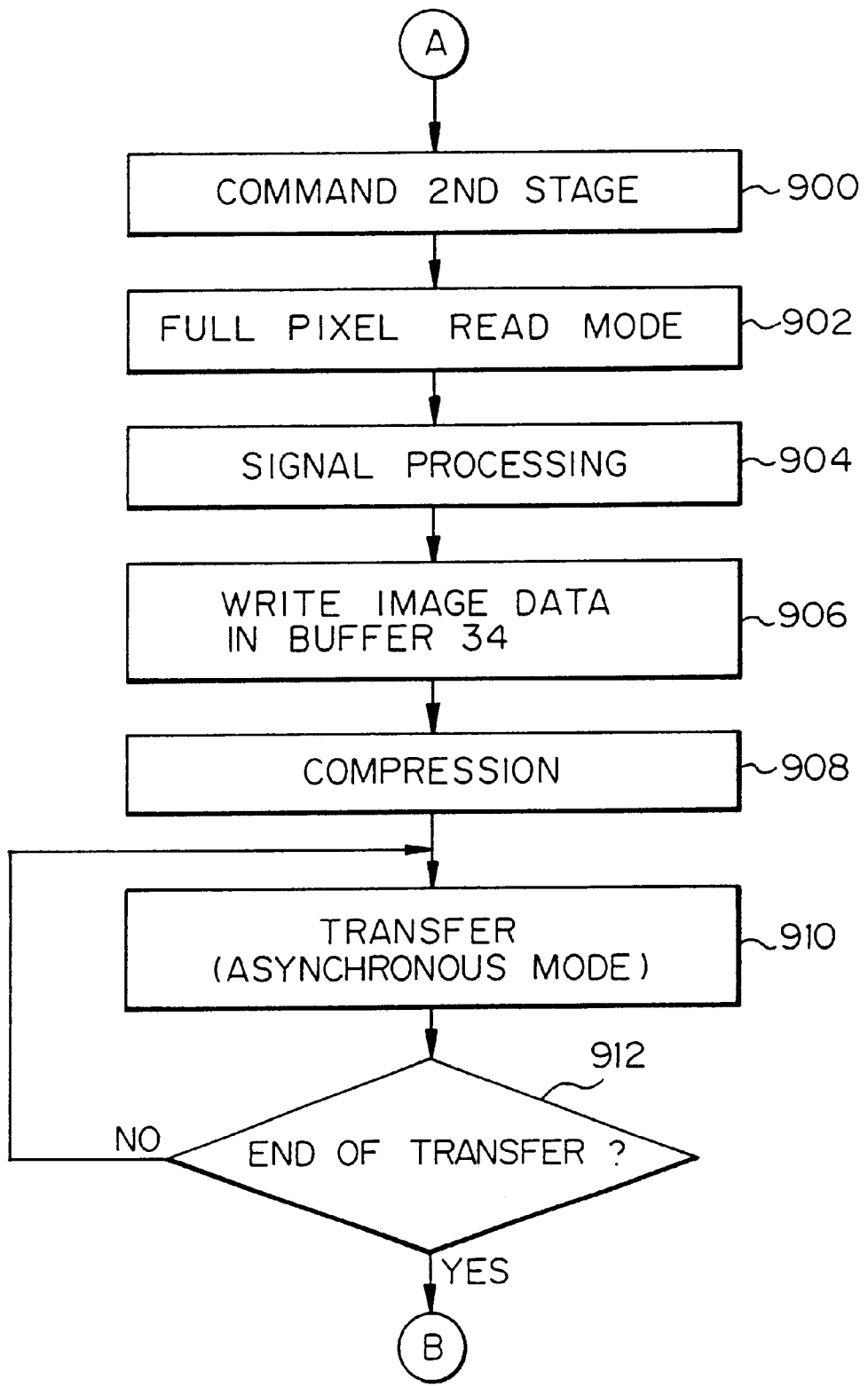

After the CPU 26 has set up the transfer mode in the step 708, it commands the first stage of operation (step 800, FIG. 8). In the first stage, the CPU 26 delivers to the CCD drive control 24 a command signal for causing it to drive the image sensor 22 in the ½ partial pixel read mode (step 802). In response, the control 24 generates a drive signal 100 for driving the image sensor 22 in the ½ partial pixel read mode. The drive signal 100 causes the image sensor 22 to halve the number of pixels on the vertical transfer path VCCD, as described with reference to FIG. 4. The resulting 1,280 (H)×512 (V) pixels of image data output from the image sensor 22 are applied to the analog signal processing 28 via the connection line 102. The signal processing 28 performs color correction and other conventional signal processing with the input image data. The ADC 30 digitizes the processed image data output from the signal processing 28, thereby outputting digital image data. Such signal processing is collectively represented by a step 804. The digital image data are routed through the digital signal processing 32 to the buffer memory 34 and temporarily stored therein. In the buffer memory 34, the image data have their pixel strings thinned, or reduced, in the horizontal direction and have the upper and lower lines of the image omitted (step 806). As a result, 640 (H)×480 (V) pixels of image data are read out of the buffer memory 34 and delivered to the image processing 32.

The 640 (H)×480 (V) pixels of image data appearing on the output 112 of the signal processing 32 are selected by the selector 38 and fed to the I/F 44 via the connection line 126. At this instant, the CPU 26 sets up the isochronous mode. The I/F 44 outputs the arbitration signals image data and control codes including the end code to the cable 16 via its input/output terminal 50 in the isochronous mode (step 808). Specifically, if the arbitration signal has enabled communication, a data packet representative of one picture is output to the cable 16. If the arbitration signal has failed to enable communication, the same packet is again sent, but at a different timing. When even the resending fails, the I/F 44 reports the failure to the CPU 26.

In the device 10b, the transmission I/F 52 receives the data packet including the image data via the cable 16 and its input/output terminal 60. The image data are once written to the buffer memory 64 via the bus 142 and then input to the reproduction 68. The reproduction 68 transforms the image data to ROB image data matching with the specifications of the monitor 18 and feeds the RGB image data to the monitor 18. Consequently, the image represented by one frame of image data appears on the screen of the monitor 18. This is also true with images sequentially received from the camera 10a in the isochronous mode. The operator, watching the real time image appearing on the device 10b, can perform desired framing, i.e., determine a desired range and composition for shooting and recording a desired subject.

When the data packet including one frame of thinned image data is fully sent from the camera 10a to the device 10b, the CPU 26 determines whether or not a release command is input on the operation 56 or 70 (step 810). Specifically, a release command may be fed from the operation 56 of the camera 10a to the CPU 26. Alternatively, a data packet including information indicative of a release command may be received from the device 10b via the cable 16, in which case the I/F 44 reports the information to the CPU 26. In any case, if the answer of the step 810 is YES, the routine advances to a step 900 shown in FIG. 9. If the answer of the step 810 is NO, the routine returns to the step 802 in order to cause the image sensor 22 to output the image signal of the next frame in the ½ partial pixel read mode. This is again followed by the sequence of steps 802–810. Consequently, image data for framing are sequentially sent to the device 10b in the isochronous mode.

In the step 900, the CPU 26 commands the second stage of operation. Specifically, the CPU 26 delivers the drive signal 100 to the CCD drive control 24 so as to cause it to drive the image sensor 22 in the full pixel read mode (step 902). In the full pixel read mode, the image sensor 22 outputs all the pixels field by field, as shown in FIG. 3. The resulting image signal is input to the analog signal processing 28 and processed thereby in the same manner as in the step 804. The processed image signal output from the signal processing 28 is converted to digital data by the ADC 30. This part of the procedure is collectively represented by a step 904. The digital image signal is temporarily stored in the buffer memory 34 (step 906) and then sequentially read out and fed to the data compression 42 via the signal processing 32. The data compression 42 compresses and codes the input image data, e.g., block by block (step 908). The coded image data are delivered to the I/F 44 via the output 118 of the data compression 42, selector 48, and the output 126 of the selector 126.

After the step 908, the CPU 26 sets up the asynchronous transfer mode. In the asynchronous transfer mode, the I/F 44 outputs the arbitration signal, image data and control codes including the end code to the cable 16 via its input/output terminal 50 at a data rate matching with the ability of the device 10b (step 910). Specifically, if the arbitration signal has enabled communication, a data packet representative of one frame is output to the cable 16. If the arbitration signal has failed to enable communication, the same packet is again sent at the next timing. When even the resending fails, the I/F 44 reports the failure to the CPU 26.

After the step 910, the CPU 26 determines whether or not one frame of image data have been fully sent to the device 10b in the asynchronous mode (step 912). If the answer of the step 912 is YES, the routine returns to the step 800 (first stage) and repeats the successive sequence of steps. Alternatively, if the answer of the step 912 is YES, the routine may return to the step 700 shown in FIG. 7; in this case, the CPU 26 may automatically restore the camera record mode if information cannot be transferred, a s determined by the confirmation of the connection of the cable 16 and communication checking.

During transmission in the step 910 the device 10b writes the image data coming in through the I/F 52 to the storage medium 20 via the buffer memory 64. The image data stored in the medium 20 are read out in response to operation information output from the operation 70, expanded and decoded by the data expansion 66, and then input to the reproduction 68 via the connection line 114. The reproduction 68 transforms the input image data to a format matching with the destination of the image data which is designated by the operation information 152. For example, when the image data should be fed to the printer 72, the reproduction 6 8 transforms the image data to the YMCK format and then produces them on its output 150. When the image data should be output to the public communication network, the reproduction 68 transforms the image data to a format matching WITH the network and then sends them to the network via, e.g., a modem, not shown.

Figure 10:
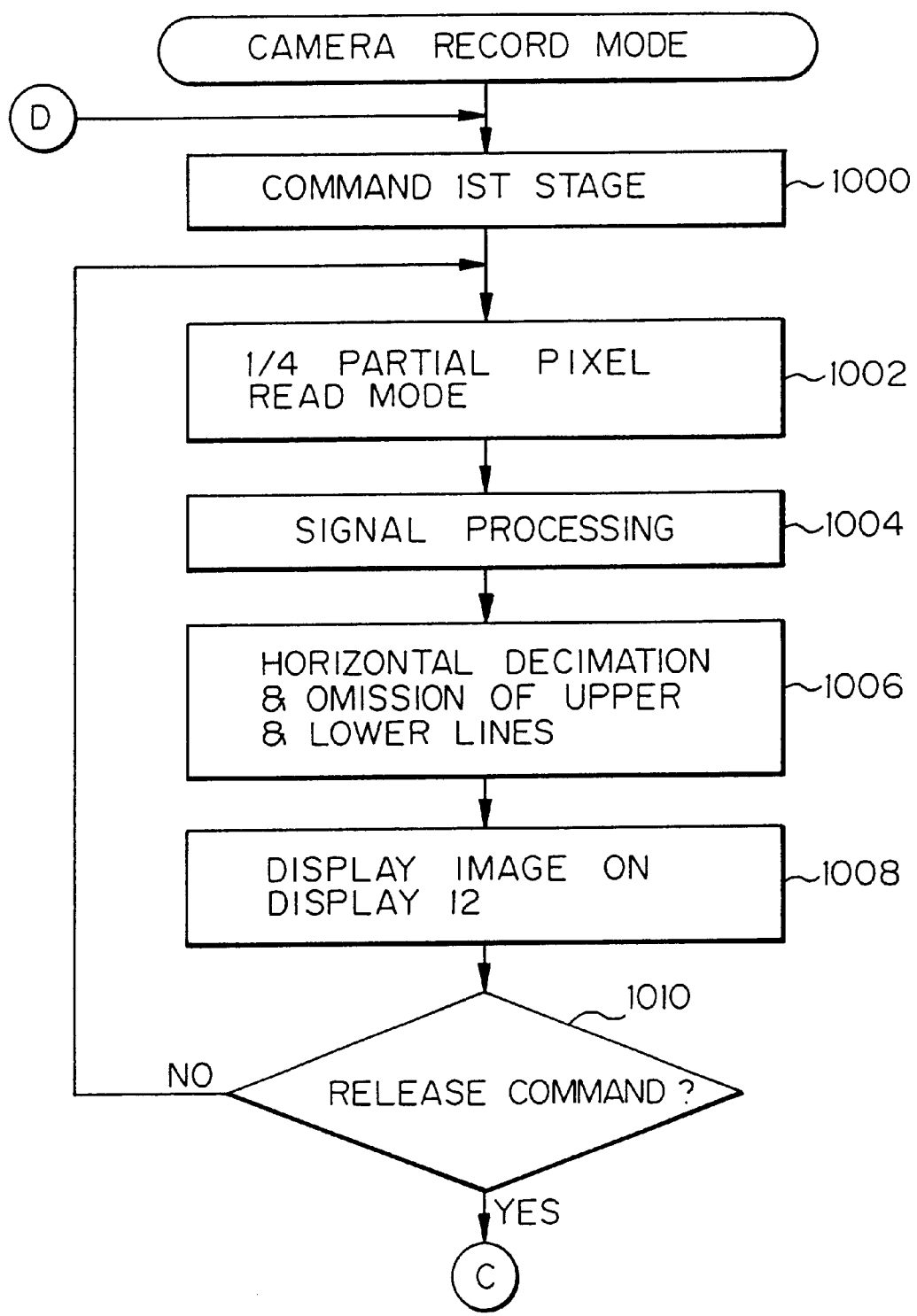
Figure 11:
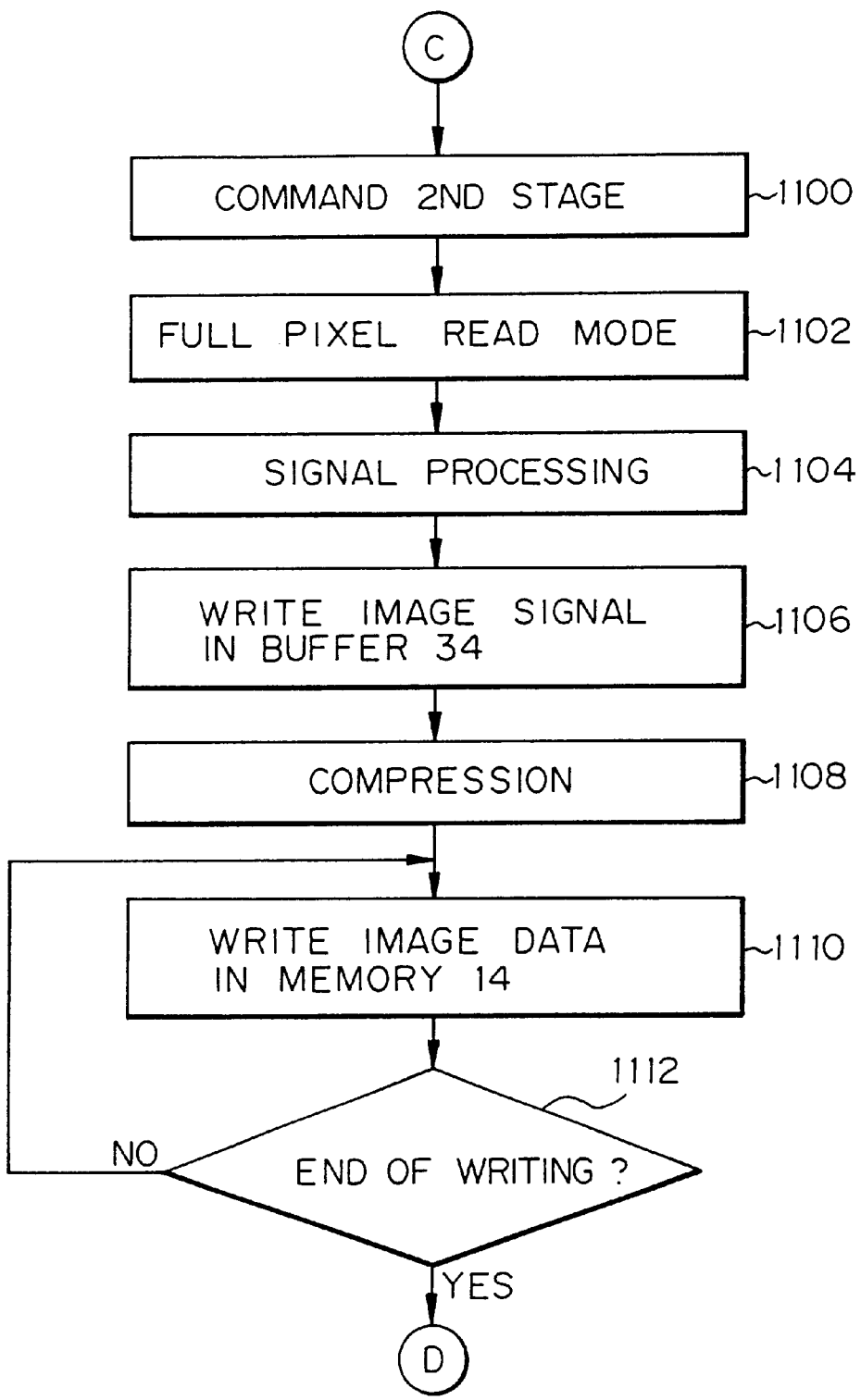

When the camera record mode is set up in the step 702 or 712 shown in FIG. 7 or by the operation information, the camera 10a performs the following operation. As shown in FIG. 10, the CPU 26 commands the first stage of operation (step 1,000). In the first stage, the CPU 26 delivers to the CCD drive control 24 a command signal for causing it to drive the image sensor 22 in the ¼ partial pixel read mode (step 1,002). In response, the control 24 generates a drive signal 100 for driving the image sensor 22 in the ¼ partial pixel read mode. The drive signal 100 causes the image sensor 22 to reduce the number of pixels on the vertical transfer path VCCD to one-fourth. The resulting 1,280 (H)×256 (V) pixels of image data output from the image sensor 22 are applied to the analog signal processing 28 via the connection line 102, The signal processing 28 performs color correction and other conventional signal processing with the input image data. The ADC 30 digitizes the processed image data output from the signal processing 28, thereby outputting digital image data. Such signal processing is collectively represented by a step 1,004. The digital image data are routed through the digital signal processing 32 to the buffer memory 34 and temporarily stored therein. In the buffer memory 34, the image data have their pixel strings decimated, or reduced, in the horizontal direction and have the upper and lower lines of the image omitted (step 1,006). As a result, 320 (H)×240 (V) pixels of image data are read out of the buffer memory 34 and delivered to the image processing 32.

The 320 (H)×240 (V) pixels of image data appearing on the output 112 of the signal processing 32 are input to the reproduction 36. The reproduction 12 transforms the input image data to the RGB signal format matching with the display 12. As a result, one frame representative of the transformed image data appears on the display 12 (step 1,008). Subsequently, the CPU 26 determines whether or not a release command is input on the operation 56 or 70 (step 1,010). Again, a release command may be fed from the operation 56 of the camera 10a to the CPU 26. Alternatively, a data packet including information indicative of a release command may be received from the device 10b via the cable 16, in which case the I/F 44 will report the information to the CPU 26. In any case, if the answer of the step 1,010 is YES, the routine advances to a step 1,100 shown in FIG. 11. If the answer of the step 1,010 is NO, the routine returns to the step 1,002 in order to cause the image sensor 22 to output the image signal of the next frame in the ¼ partial pixel read mode. This is again followed by the sequence of steps 1,002–1,010. Consequently, image data for framing are sequentially delivered to the display 12, so that corresponding images sequentially appear on the display 12.

In the step 1,100, the CPU 26 commands the second stage of operation. Specifically, the CPU 26 delivers the drive signal 100 to the CCD drive control 24 so as to cause it to drive the image sensor 22 in the full pixel read mode (step 1,102). In the full pixel read mode, the image sensor 22 outputs all the pixels field by field. The resulting image signal is input to the analog signal processing 28 and processed thereby in the same manner as in the step 1,004. The processed image signal output from the signal processing 28 is converted to digital data by the ADC 30. This part of the procedure is collectively represented by a step 1,104. The digital image signal is temporarily stored in the buffer memory 34 (step 1,106) and then sequentially read out and fed to the data compression 42 via the signal processing 32. The data compression 42 compresses and codes the input image data, e.g., block by block (step 1,108). The coded image data are delivered to the card I/F 46 via the output 120 of the data compression 42, selector 40, and the output 128 of the selector 40.

The image data input to the card I/F 46 are sequentially written to the preselected area of the removable memory 14 by a write control signal fed from the I/F 46 to the memory 14 via the connector 54. On determining that one frame of image data have been fully written to the memory 14 (YES, step 1,112), the CPU 26 returns to the step 1,000 in order to again command the first stage and repeat framing and consecutive processing. Alternatively, when the answer of the step 1,112 is YES, the routine may return to the step 700 shown in FIG. 7; in which case, the CPU 26 may automatically restore the transfer mode if information can be transferred, as determined by the communication checking.

Further, the digital camera system 10 is capable of operating in any particular mode designated via the operation 56 or 70, as follows. For example, when the image data output from the image sensor 22 in the full pixel read mode should be sent from the camera 10*a* to the device 10*b* without being compressed, the CPU 26 causes the selector 38 to select its input 114. In this condition, the uncompressed image data are sent to the device 10*b* via the I/F 44 in the asynchronous mode. The image data so received by the device 10*b* are selectively written to the storage medium 20 or produced on the output 146 of the reproduction 68 under the control of the controller 62 corresponding to the operator's manipulation. The image data on the output 146 may be sent to a remote apparatus via the digital network or similar public network. Of course, the image data may be compressed and packetized before the transmission to the remote apparatus.

When the image data output from the image sensor 22 in the full pixel read mode should be written to the removable memory 14 without being compressed, the CPU 26 invalidates the compressing function of the data compression 42. In this condition, the image data 114 output from the digital signal processing 32 are applied to the selector 40 via the connection line 120. At this instant, the selector 40 has selected its input 120 under the control of the CPU 26. As a result, the image data are fed to the card I/F 46 via the selector 40 and then written to the removable memory 14.

Assume that the image data written to the removable memory 14 without being compressed should be read out, compressed, and sent. Then, the image data read out of the memory 14 are routed through the card I/F 46 and connection line 128 to the selector 40. In this case, the selector 40 has selected the connection line 112 under the control of the CPU 26. Therefore, the image data input to the selector 40 are applied to the digital signal processing 32 via the connection line 112 and once written to the buffer memory 34. Subsequently, the image data read out of the buffer memory 34 are sent from the camera 10*a* to the device 10*b* via the cable 16 in the asynchronous mode, as in the steps 906–910 shown in FIG. 9.

When the image data stored in the removable memory 14 without being compressed should be read out and directly sent, the image data are fed to the selector 40 via the card I/F 46 and connection line 128. At this instant, the selector 40 has selected the connection line 112 under the control of the CPU 26. At the same time, the selector 38 has selected the input 112 under the control of the CPU 26. As a result, the image data read out of the memory 14 are input to the transmission I/F 44 and then sent to, e.g., the device 10*b* in the asynchronous mode.

As stated above, in the partial pixel read mode, the camera 10*a* selectively reads one-half or one-fourth of the pixels of the image sensor 22 by interlacing. The resulting thinned image signal are processed. The processed image signal may be sent to an external device in the isochronous mode guaranteeing a data rate and displayed on the external device, or may be displayed on a display built in the camera 10*a*. This implements framing based on a real time image or a quasi-real time image.

In the full pixel read mode, the camera 10*a* is capable of picking up a scene with the maximum ability of the image sensor 22 and outputting image data of high pixel density. It is therefore possible not only to record and store the image data of high pixel density in a memory card or similar storage medium, but also to transfer such image data in the asynchronous mode for producing a printing. In this manner, the camera 10 is capable of implementing both the real time transmission and display of an image on an external apparatus and the recording and transmission of an image shot with a high pixel density.

On the other hand, the image reproducing/filing device 10*b* is capable of receiving the image data being picked up by the partial pixel read mode by the camera 10*a* and transferred thereto in the isochronous mode, and displaying a real time image represented by the image data. In addition, the device 10*b* is capable of outputting to, e.g., the printer 72 the image data of high resolution shot in the full pixel read mode.

The embodiment shown and described transfers, in the transfer modes the image data output in the partial pixel read mode and the image data output in the full pixel read mode to the device 10*b* in the isochronous mode and the asynchronous mode, respectively, or displays and records them in the camera 10*a* in the camera record mode. If desired, an arrangement may be made such that the image data output in the partial pixel read mode are sent to the device 10*b* while the image data output in the full pixel read mode are written to the removable memory 14 connected to the connector 54.

In summary, in accordance with the present invention, control means causes a first signal output from imaging means in a partial pixel read mode to be fed to transmitting means, and causes the transmitting means to transmit the image signal via a communication channel while guaranteeing a data rate. Further, the control means causes a second image signal output from the imaging means in a full pixel read mode in response to a release command to be fed to either one of the transmitting means and recording means. It is therefore possible to send an image from a digital camera to the outside in real time, and to allow a person to perform framing while watching the real time image appearing on a reproducing device It is also possible to output image data of high pixel density produced in the full pixel read mode, and send them or record them in a storage medium.

Moreover, the first image signal can be serially transmitted in an isochronous mode guaranteeing the data rate of the signal while the second image signal can be serially sent in an asynchronous mode. This allows an image represented by the first image signal to be sent instantaneously for a framing purpose, and allows a high definition image represented by the second image signal to be sent or recorded.

The entire disclosure of Japanese patent application No. 250187/1996 filed on Sep. 20, 1996 including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A digital camera for shooting a subject and outputting a digital image signal representative of the subject, comprising:

an imaging device selectively operable, in response to a drive signal, in a partial pixel read mode for outputting a first image signal of one frame in which pixels constituting an image of said subject are reduced in a vertical direction, or in a full pixel read mode for outputting a second image signal of one frame of two fields, including all of said pixels constituting the image;

a converting circuit for converting each of said image signals selectively output from said imaging device to a digital image signal;

a signal processing circuit for processing said digital image signal;

an outputting circuit for outputting the image signals selectively output from said imaging device; and a control circuit for controlling an operation of said digital camera, said control circuit selecting one of said partial pixel read mode and said full pixel read mode, and feeding said drive signal to said imaging device for causing said imaging device to operate in a selected one of said partial pixel read mode and said full pixel read mode;

said imaging device comprising a plurality of light-sensitive elements, each corresponding to a particular pixel, a vertical transfer path for transferring, in a vertical direction, charges generated by the light-sensitive elements arranged in a vertical direction, and a horizontal transfer path for transferring, in a horizontal direction, said charges transferred from said vertical transfer path and outputting said charges;

said outputting circuit including a transmitting circuit for transmitting in accordance with the IEEE 1394 standard, on a communication channel, the first image signal output from said imaging device in said partial pixel read mode and then output from said signal processing circuit, while selecting a transmitting mode of guaranteeing a data rate of said first image signal, or transmitting, on said communication channel the second image signal output from said imaging device in said full pixel read mode and then output from said signal processing circuit, and a recording circuit for recording said second image signal in a storage medium removably connected to a connector, while selecting a recording mode of activating said recording circuit;

said imaging device selectively transferring, in said partial pixel read mode set up by said control circuit, said charges generated in said light-sensitive elements to said vertical transfer path while selecting a charge transfer mode of reducing pixels at an interval of a preselected number of pixels with a charge of at least one of the pixels reduced at the interval being added to a charge of one of the pixels remaining from reducing the pixels at the interval transferred, outputting said charges transferred on said vertical transfer path as the first image signal of one frame, said imaging device selectively transferring, in said full pixel read mode set up by said control circuit, said charges generated in said light-sensitive elements to said vertical transfer path while on a field-by-field basis to output said charges transferred on said vertical transfer path as said second image signal of one frame;

said control circuit feeding said first image signal to said transmitting circuit to thereby sequentially transmit said first image signal on said communication channel, said control circuit setting up said full pixel read mode in response to a command input by an operator to thereby feed said second image signal to said transmitting circuit or said recording circuit;

said transmitting circuit having an isochronous transmitting finction for serially transmitting said first image signal in an isochronous mode at the guaranteed data rate while guaranteeing an amount of data to be transferred for a preselected period of time, and an asynchronous transmitting function for transmitting the second image signal in an asynchronous mode at a data rate matching an ability of a destination to which said communication channel is connected.

2. A digital camera in accordance with claim 1, further comprising a compressing circuit for compressing and coding said second image signal output from said signal processing circuit, said control circuit feeding said second image signal output from said compressing circuit to said outputting circuit, whereby said second image signal is output from either one of said transmitting circuit and said recording circuit.

3. A digital camera in accordance with claim 2, further comprising a buffer circuit for temporarily storing said second image signal output from said signal processing circuit, said compressing circuit compressing said second image signal read out of said buffer circuit.

4. A digital camera in accordance with claim 1, wherein said transmitting circuit reports to said control circuit command information received via said communication channel in response to said command, said control circuit designating said full pixel read mode in accordance with said command information.

5. A digital camera in accordance with claim 1, wherein said transmitting circuit comprises a checking circuit for determining whether or not said transmitting circuit can hold communication with another apparatus, said control circuit causing, when communication can be held, said first and second image signals to be fed to and then output from said transmitting circuit.

6. A digital camera in accordance with claim 5, wherein said outputting circuit comprises a reproducing circuit for sequentially displaying images represented by said first image signal, said control circuit causing, when communication cannot be held, said first image signal to be output from said reproducing circuit.

7. A digital camera in accordance with claim 6, further comprising a display connected to an output of said reproducing circuit for displaying the images represented by said first image signal.

8. A digital camera in accordance with claim 1, further comprising an operating section for generating operation information corresponding to an operator's operation, said control circuit causing said second image signal to be fed to either one of said transmitting circuit and said recording circuit, depending on an operation state output from said operating section.

9. A digital camera in accordance with claim 1, wherein said signal processing circuit comprises a horizontal reduction circuit for reducing in the horizontal direction said first image signal output from said converting circuit to a number of pixels suitable for displaying the image represented by said first image signal;

said horizontal reduction circuit producing a third image signal from said first image signal;

said transmitting circuit transmitting isochronously said third image signal.

10. A digital camera system for shooting a subject and outputting a digital image signal representative of said subject, including:

a digital camera and an image reproducing device connected to said digital camera via a communication channel, said digital camera comprising:

an imaging device selectively operable, in response to a drive signal, in a partial pixel read mode for outputting a first image signal of one frame in which pixels constituting an image of said subject are reduced in a vertical direction, or in a full pixel read mode for outputting a second image signal of one frame of two fields including all of said pixels constituting the image;

a converting circuit for converting each of said image signals selectively output from said imaging device to a digital image signal;

a signal processing circuit for processing said digital image signal;

an outputting circuit for outputting the image signals selectively output from said imaging device; and a control circuit for controlling an operation of said digital camera, said control circuit selecting one of said partial pixel read mode and said full pixel read mode, and feeding said drive signal to said imaging device for causing said imaging device to operate in a selected one of said partial pixel read mode and said full pixel read mode;

said imaging device comprising a plurality of light-sensitive elements each corresponding to a particular pixel, a vertical transfer path for transferring, in a vertical direction, charges generated by the light-sensitive elements arranged in a vertical direction, and a horizontal transfer path for transferring, in a horizontal direction, said charges transferred from said vertical transfer path and outputting said charges;

said outputting circuit including a transmitting circuit for transmitting in accordance with the IEEE 1394 standard, on a communication channel, the first image signal output from said imaging device in said partial pixel read mode and then output from said signal processing circuit, while selecting a transmitting mode of guaranteeing a data rate of said first image signal, or transmitting, on said communication channel the second image signal output from said imaging device in said full pixel read mode and then output from said signal processing circuit, and a recording circuit for recording said second image signal in a storage medium removably connected to a connector, while selecting a recording mode of activating said recording circuit;

said imaging device selectively transferring, in said partial pixel read mode set up by said control circuit, said charges generated in said light-sensitive elements to said vertical transfer path while selecting a charge transfer mode reducing pixels at an interval of a preselected number of pixels with a charge of at least one of the pixels reduced at the interval being added to a charge of one of pixels remaining from reducing the pixels at the interval, outputting said charges transferred on said vertical transfer path as the first image signal of one frame, said imaging device selectively transferring, in said fall pixel read mode set up by said control circuit, said charges generated in said light-sensitive elements to said vertical transfer path while on a field-by-field basis to output said charges transferred on said vertical transfer path as said second image signal of one frame;

said control circuit feeding said first image signal to said transmitting circuit to thereby sequentially transmit said first image signal on said communication channel, said control circuit setting up said full pixel read mode in response to a command input by an operator to thereby fed said second image signal to said transmitting circuit or said recording circuit;

said transmitting circuit having an isochronous transmitting function for serially transmitting said first image signal in an isochronous mode at the guaranteed data rate while guaranteeing an amount of data to be transferred for a preselected period of time, and an asynchronous transmitting function for transmitting the second image signal in an asynchronous mode at a data rate matching an ability of a destination to which said communication channel is connected, said image reproducing device comprising:

a second transmitting circuit for receiving said first image signal on said communication channel, and transmitting an acknowledgement of receipt to said transmitting circuit on said communication channel; and an outputting circuit for outputting said first and second image signals received by said second transmitting circuit;

said second transmitting circuit comprising a first receiving circuit for guaranteeing an amount of data to be transmitted during a preselected period of time and receiving, on said communication channel, said first image signal serially transmitted in said isochronous mode at the guaranteed data rate, and a second receiving circuit for receiving said second image signal serially transmitted in said asynchronous mode on said communication channel.

11. A digital camera system in accordance with claim 10, wherein said second transmitting circuit transmits command information corresponding to said command to said first transmitting circuit on said communication channel.

* * * * *

UNITED STATES PATENT AND TRADEMARK OFFICE
CERTIFICATE OF CORRECTION

PATENT NO.    : 6,529,236 B1
DATED         : March 4, 2003
INVENTOR(S)   : Mikio Watanabe It is certified that error appears in the above-identified patent and that said Letters Patent is hereby corrected as shown below:

<u>Title page, Item [54] and Column 1, lines 1 through 4,</u>
Please delete the title of the above-referenced patent and replace with the following title: -- DIGITAL CAMERA FOR OUTPUTTING DIGITAL IMAGE SIGNALS AND IMAGE REPRODUCING DEVICE CONNECTABLE THERETO --

Signed and Sealed this

Ninth Day of September, 2003

JAMES E. ROGAN
*Director of the United States Patent and Trademark Office*